(12) United States Patent
Lodge, Jr. et al.

(10) Patent No.: US 7,020,369 B2
(45) Date of Patent: Mar. 28, 2006

(54) RIBBON WITH FIBER OPTICS

(75) Inventors: Thomas R. Lodge, Jr., Philadelphia, PA (US); Andrew N. Lodge, Medford, NJ (US); Gary Kemp, Euless, TX (US)

(73) Assignee: Berwick Offray LLC, Berwick, PA (US)

( * ) Notice: Subject to any disclaimer, the term of this patent is extended or adjusted under 35 U.S.C. 154(b) by 0 days.

(21) Appl. No.: 10/885,800

(22) Filed: Jul. 8, 2004

(65) Prior Publication Data

US 2006/0008215 A1    Jan. 12, 2006

(51) Int. Cl.
*G02B 6/44* (2006.01)

(52) U.S. Cl. .................. 385/100; 385/901; 362/565

(58) Field of Classification Search ............... 385/100, 385/123, 901; 362/551, 554, 556, 565, 566, 362/806, 808
See application file for complete search history.

(56) References Cited

U.S. PATENT DOCUMENTS 3,497,981 A * 3/1970 Tyne ........................... 40/547
5,558,422 A * 9/1996 Sanford ...................... 362/565
6,174,072 B1 * 1/2001 Root, Jr. ..................... 362/190
6,296,366 B1 * 10/2001 Hopps ........................ 362/154
6,301,418 B1 * 10/2001 Freier et al. ................ 385/123
6,347,172 B1 * 2/2002 Keller et al. ................ 385/102
6,352,355 B1 * 3/2002 Law ............................ 362/253
6,366,719 B1 * 4/2002 Heath et al. ................. 385/31
6,568,828 B1 * 5/2003 Rudoy ........................ 362/154

OTHER PUBLICATIONS

Merriam Webster's Collegiate Dictionary, copyrighted 2001, Merriam-Webster Incorporated, 10th Edition, p. 1335.*

* cited by examiner

*Primary Examiner*—Kaveh Kianni
*Assistant Examiner*—Christopher M. Kalivoda
(74) *Attorney, Agent, or Firm*—McCarter & English, LLP

(57) ABSTRACT

A combination ribbon for bows or other decorative uses, which includes a central ribbon with a fiber optic cable therein, or at least one translucent cable jacket on one edge of the ribbon with a fiber optic cable therein, which cable has portions of its sheath removed to provide light patterns upon the shining of a light source therein.

10 Claims, 2 Drawing Sheets

RIBBON WITH FIBER OPTICS

BACKGROUND OF THE INVENTION

1. Field of the Invention

This invention relates to a combination ribbon for bows or other decorative purposes, which has at least one fiber optic cable combined within the ribbon, or in a translucent cable jacket on the edge of the ribbon, extending longitudinally thereon, with cut-outs in the cable to project selected light patterns.

2. Description of the Prior Art

Fiber optic cables are well known in the art for transmitting light from a light source to a point of desired illumination. In addition, it is known to strip away or to provide a side emitting optical fiber, wherein the cable is at least partially translucent along its length. Examples of such apparatus are shown in various U.S. patents such as U.S. Pat. No. 6,347,172 B1 to Keller et. al., U.S. Pat. No. 5,558,422 to Sanford, U.S. Pat. No. 6,174,072 B1 to Root, U.S. Pat. No. 6,296,366 B1 to Hopps, U.S. Pat. No. 6,568,828 B2 to Rudoy, U.S. Pat. No. 3,497,981 to Tyne, U.S. Pat. No. 6,301,418 B1, and U.S. Pat. No. 6,366,719 B1 to Heath et. al. None of these patents however discloses a combination ribbon for bows or other decorative purposes, which ribbon has at least one fiber optic cable therein or attached thereto with cut-outs providing selected light patterns.

SUMMARY OF THE INVENTION

The invention is directed to a combination ribbon for bows or other decorative purposes which has a strip of ribbon with at least one fiber optic cable therein or on the ribbon edge, carried in a translucent cable jacket, with the cable having selected patterns in its outer protective sheath to allow light to be emitted therefrom.

The principal object of the invention is to provide a combination ribbon which includes a strip of ribbon with a fiber optic cable therein, or carried in a translucent cable jacket on at least one longitudinal edge.

A further object of the invention is to provide a ribbon of the character aforesaid, which may have fiber optic cables on both edges of the ribbon.

A further object of the invention is to provide a ribbon of the character aforesaid, which can be used for a variety of decorative purposes.

A further object of the invention is to provide a ribbon of the character aforesaid, which can be formed of a variety of ribbon materials both woven and non-woven.

A further object of the invention is to provide a ribbon of the character aforesaid, wherein the fiber optic cable can provide a large variety of light patterns therefrom.

A further object of the invention is to provide a ribbon of the character aforesaid which is easy to manufacture, and is suitable for mass production.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part thereof in which.

It should, of course be understood that the description and drawings herein are merely illustrative, and that various modifications and changes can be made in the structures disclosed without departing from the spirit of the invention.

Like numerals refer to like parts throughout the several views.

DESCRIPTION OF THE PREFERRED EMBODIMENTS

When referring to the preferred embodiments certain terminology will be utilized for the sake of clarity. Use of such terminology is intended to encompass not only the described embodiments, but also technical equivalents, which operate and function in substantially the same way to bring about the same result.

Figure 1:
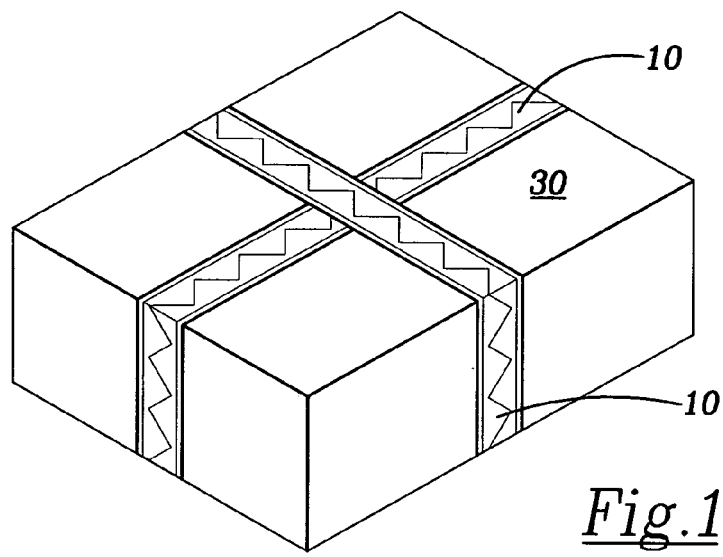
FIG. 1 is a view in perspective of a package which has the ribbon of the invention thereon.
Figure 2:
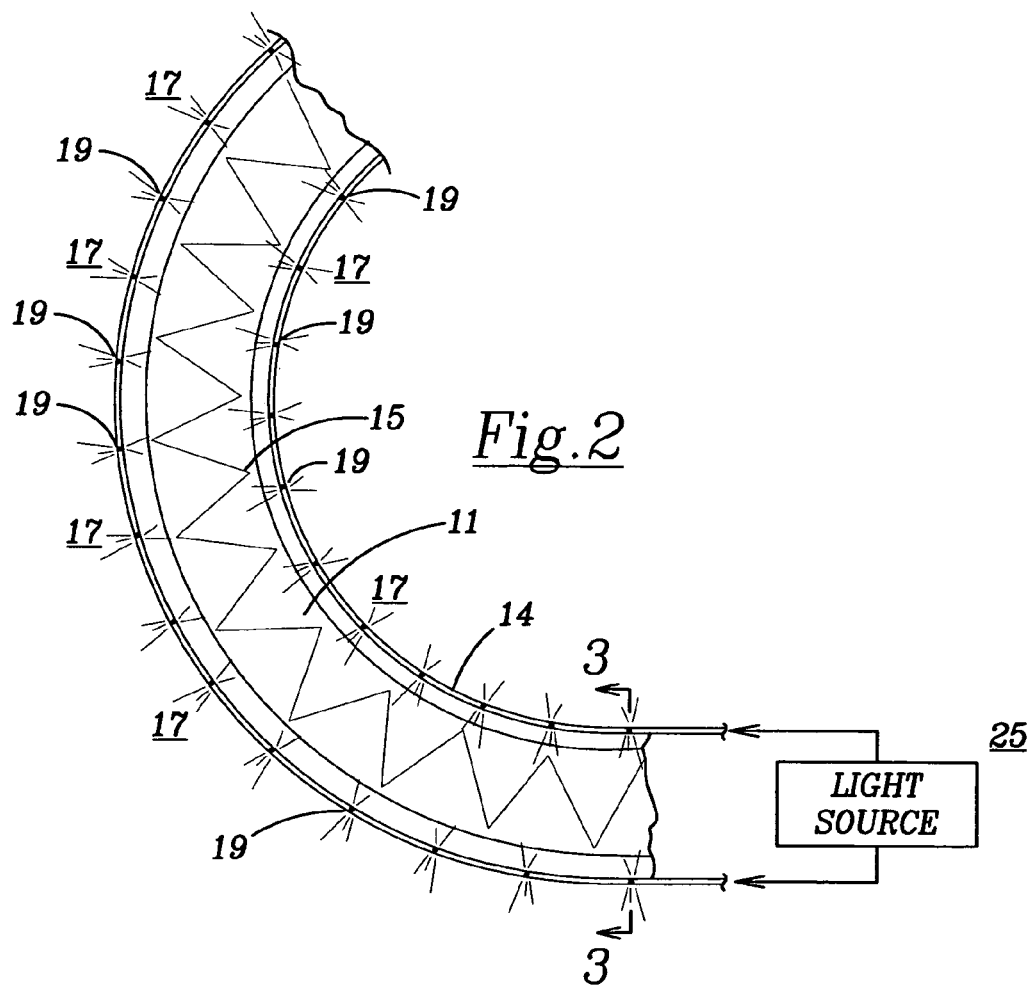
FIG. 2 is a top plan view of a portion of the ribbon of the invention.
Figure 3:
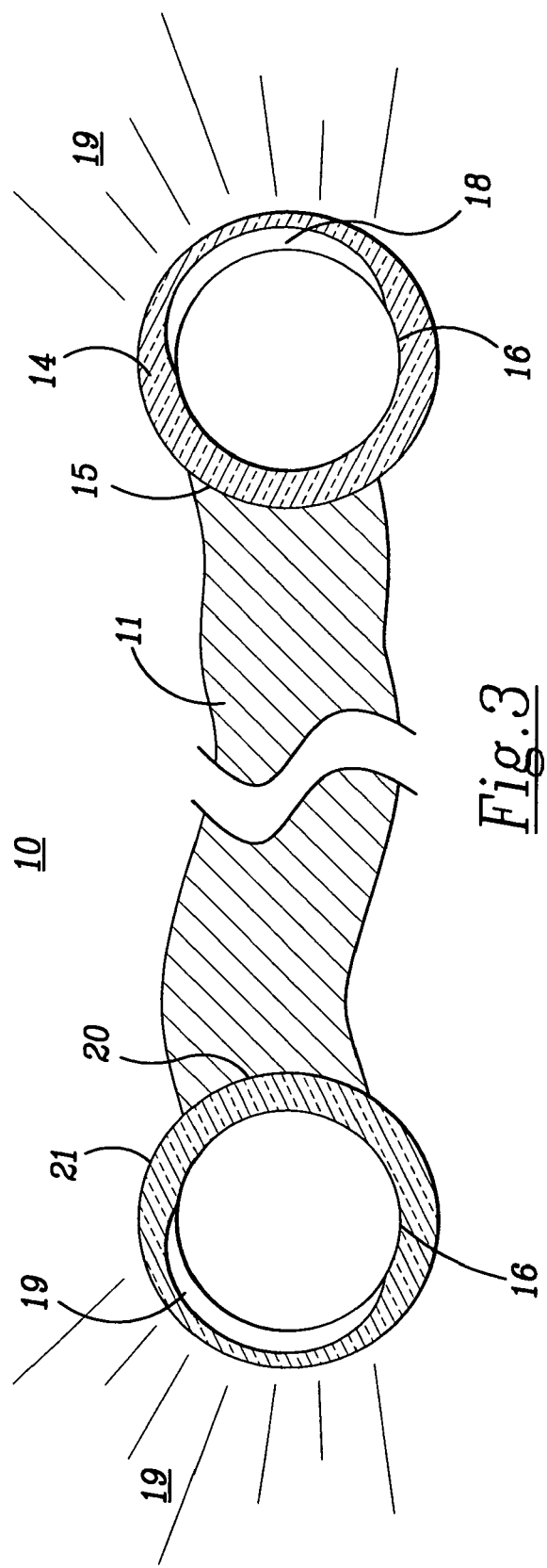
FIG. 3 is a vertical sectional view enlarged taken approximately on the line 3—3 of FIG. 2.

Referring now more particularly to the drawings and FIGS. 1 to 3 thereof, a combination ribbon 10 is therein illustrated, which includes a central strip of ribbon 11, preferably of woven or non-woven plastic material, of conventional type, which can be of solid or multiple colors as desired. In a preferred embodiment the central ribbon strip 11 has a translucent cable jacket 14 of well known type connected to and extending longitudinally along its side edge 15, which contains a fiber optic cable 16 of well known type, readily available from a variety of manufacturers. The cable 16 at selected locations 17, has a portion of its outer protective sheath 18 removed to provide a series of patterns 19, which can be circles, squares, stars or any other desired pattern (not shown). The ribbon 11 as illustrated is also provided at edge 20 with a second cable jacket 21, similar to jacket 14, with a fiber optic cable 16 therein, which can also have portions of its protective sheath removed to provide the desired patterns 19.

The fiber optic cable 16 can be woven into the ribbon 11 (not shown) or stitched thereto (not shown) or attached by any desired method, which does not interfere with the use of the ribbon 10.

A light source 25 of well known type is provided, which can be of any desired type and, which shines light into the end or cable 16, with consequent light patterns 19 being emitted therefrom. Another light source (not shown) can be utilized to provide light patterns 19 from the cable 16 at edge 20 of ribbon 11.

Referring to FIG. 1 a box 30 is illustrated, which has a ribbon 10 extending therearound, illustrating one use of the ribbon 10.

It will thus be seen that a combination ribbon has been provided with which the objects of the invention are attained.

We claim:

1. A combination ribbon, comprising a central strip of ribbon having a side edge; a translucent cable jacket attached to said side edge of said ribbon; a fiber optic cable carried within said cable jacket, said fiber optic cable having pattern means to cause light to be emitted from said fiber optic cable; and a light source to provide light to said fiber optic cable.

2. A combination ribbon, comprising a central strip of ribbon having side edges; a plurality of cable jackets, each of which is attached to a corresponding one of said side edges of said ribbon; a plurality of fiber optic cables, each of which is carried within a corresponding one of said cable jackets, said fiber optic cables having pattern means to cause light to be emitted from said fiber optic cables; and a light source to provide light to said fiber optic cables.

3. A combination ribbon as defined in claim 1 in which said ribbon is woven.

4. A combination ribbon as defined in claim 3 in which said fiber optic cable is woven into said ribbon.

5. A combination ribbon as defined in claim 1 in which said ribbon is non-woven.

6. A combination ribbon as defined in claim 1 in which said pattern means includes a protective sheath on said fiber optic cable, said protective sheath having portions removed to provide light patterns.

7. A combination ribbon as defined in claim 2 in which said ribbon is woven.

8. A combination ribbon as defined in claim 7 in which said fiber optic cables are woven into said ribbon.

9. A combination ribbon as defined in claim 2 in which said ribbon is non-woven.

10. A combination ribbon as defined in claim 2 in which said pattern means includes a protective sheath on each of said fiber optic cables, said protective sheath having portions removed to provide light patterns.

\* \* \* \* \*